(12) United States Patent
Lee et al.

(10) Patent No.: US 7,497,392 B2
(45) Date of Patent: Mar. 3, 2009

(54) PROCESS AND APPARATUS FOR TRANSFORMING WASTE MATERIALS INTO FUEL

(75) Inventors: Olaf Nathan Lee, New Richmond, WI (US); Gregory Michael Fuchs, River Falls, WI (US)

(73) Assignee: Alliance Technology Group, Inc., Carson City, NV (US)

( * ) Notice: Subject to any disclaimer, the term of this patent is extended or adjusted under 35 U.S.C. 154(b) by 161 days.

(21) Appl. No.: 11/457,941

(22) Filed: Jul. 17, 2006

(65) Prior Publication Data
US 2008/0014112 A1    Jan. 17, 2008

(51) Int. Cl.
*B02C 19/00* (2006.01)

(52) U.S. Cl. .................. 241/21; 241/24.13; 241/24.18; 241/23; 241/26; 241/65; 241/284; 241/DIG. 38

(58) Field of Classification Search .................. 241/65, 241/23, 21, DIG. 38, 299, 284, 26, 24.13, 241/24.18
See application file for complete search history.

(56) References Cited

U.S. PATENT DOCUMENTS

| | | | |
|---|---|---|---|
| 1,536,894 | A | 5/1925 | Lillie |
| 1,986,760 | A | 1/1935 | Kreissler |
| RE20,217 | E | 12/1936 | Dunbar |
| 2,229,886 | A | 1/1941 | Dunbar |
| 2,494,098 | A | 1/1950 | Lockman |
| 2,518,143 | A | 8/1950 | Huszar |
| 2,823,118 | A | 2/1958 | Merrill |
| 3,025,213 | A | 3/1962 | Copeland |
| 3,367,495 | A | 2/1968 | Lea et al. |
| 4,032,446 | A | 6/1977 | Miller, Jr. |
| 4,115,695 | A | 9/1978 | Kelman |
| 4,178,232 | A | 12/1979 | Nollet |
| 4,540,467 | A | 9/1985 | Grube et al. |

(Continued)

FOREIGN PATENT DOCUMENTS

DE    19932403    1/2001

(Continued)

OTHER PUBLICATIONS

Partial International Search Report mailed Mar. 12, 2007.

*Primary Examiner*—Mark Rosenbaum
(74) *Attorney, Agent, or Firm*—Merchant & Gould P.C.

(57) ABSTRACT

A process to transform solid waste into fuel by adding water and heat to provide no more than 350 BTUs/lb of the weight of the solid waste for no more than 85 minutes. Such a process transforms the solid waste into fuel in a process time of not greater than 85 minutes. The system uses a pressure vessel; a condenser tank to permit selective addition of water to and evacuation of steam from the vessel; a heater to increase the temperature of the vessel; a vacuum pump to selectively reduce pressure within the vessel and to help evacuate steam from the vessel to the condenser tank; and a water pump to selectively add water from the condenser tank to the interior volume of the vessel. A method for converting solid waste into fuel includes loading the solid waste into a rotating pressure vessel and transforming the solid waste into fuel by adding water; reducing pressure; adding heat; and then evacuating steam. The contents are evacuated from the pressure vessel. At least some of the contents are fuel.

19 Claims, 2 Drawing Sheets

U.S. PATENT DOCUMENTS

| | | |
|---|---|---|
| 4,540,495 A | 9/1985 | Holloway |
| 4,622,860 A | 11/1986 | Cametti |
| 4,844,351 A | 7/1989 | Holloway |
| 4,974,780 A | 12/1990 | Nakamura et al. |
| 4,974,781 A | 12/1990 | Placzek |
| 5,050,375 A | 9/1991 | Dickinson |
| 5,119,994 A | 6/1992 | Placzek |
| 5,134,944 A | 8/1992 | Keller |
| 5,142,830 A | 9/1992 | Carpenter |
| 5,176,793 A | 1/1993 | Kurtz |
| 5,190,226 A | 3/1993 | Holloway |
| 5,217,688 A | 6/1993 | Von Lersner |
| 5,253,764 A | 10/1993 | Gement |
| 5,261,225 A | 11/1993 | Dickinson |
| 5,361,994 A | 11/1994 | Holloway |
| 5,383,499 A | 1/1995 | Mattern |
| 5,403,442 A | 4/1995 | Henricson et al. |
| 5,407,817 A | 4/1995 | Lightsey |
| 5,424,033 A | 6/1995 | Roland |
| 5,427,650 A | 6/1995 | Holloway |
| 5,439,556 A | 8/1995 | Sethna et al. |
| 5,445,329 A | 8/1995 | Anderson |
| 5,517,004 A | 5/1996 | Blonk |
| 5,540,391 A | 7/1996 | Anderson |
| 5,556,445 A | 9/1996 | Quinn |
| 5,570,845 A | 11/1996 | Lewis |
| 5,611,673 A | 3/1997 | Agata |
| 5,655,718 A | 8/1997 | Anderson |
| 5,666,878 A | 9/1997 | Taricco |
| 5,705,216 A | 1/1998 | Tyson |
| 6,221,207 B1 | 4/2001 | Forslund et al. |
| 6,267,309 B1 | 7/2001 | Chieffalo |
| 6,306,248 B1 | 10/2001 | Eley |
| 6,328,234 B1 | 12/2001 | Saucier et al. |
| 6,336,993 B1 | 1/2002 | Stromberg |
| 6,397,492 B1 | 6/2002 | Malley |
| 6,413,364 B1 | 7/2002 | Sandison |
| 6,419,828 B1 | 7/2002 | Russo |
| 6,458,240 B1 | 10/2002 | Bouchette et al. |
| 6,524,436 B2 | 2/2003 | Kettunen |
| 6,588,690 B1 | 7/2003 | Koenig |
| 6,732,962 B1 | 5/2004 | Butler |
| 6,752,337 B2 | 6/2004 | Koenig |
| 2007/0190643 A1* | 8/2007 | Noll ..................... 435/290.3 |

FOREIGN PATENT DOCUMENTS

| | | |
|---|---|---|
| EP | 0 908 190 A2 | 4/1999 |
| GB | 450209 | 7/1936 |
| GB | 2 370 242 | 6/2002 |
| JP | 9047747 | 2/1997 |
| JP | 10137718 | 5/1998 |
| JP | 10156209 | 6/1998 |
| JP | 2001039787 | 2/2001 |
| JP | 2004108727 | 4/2004 |
| JP | 2004130235 | 4/2004 |
| WO | 94/00162 | 1/1994 |
| WO | 95/13148 | 5/1995 |
| WO | WO 95/13148 | 5/1995 |
| WO | 00/72987 | 12/2000 |
| WO | 03/035970 A1 | 5/2003 |
| WO | 2006/041437 | 4/2006 |
| WO | 2006/041439 | 4/2006 |
| WO | WO2006/041437 A | 4/2006 |

* cited by examiner

PROCESS AND APPARATUS FOR TRANSFORMING WASTE MATERIALS INTO FUEL

TECHNICAL FIELD

This disclosure relates generally to the treatment of waste materials. In particular, this disclosure relates to apparatus and processes for transforming solid waste, such as municipal solid waste, medical waste, manure, or carcasses and the like, into process engineered fuel.

BACKGROUND

The disposal of solid waste materials has become a problem for public and private organizations. Recycling programs have successfully used only a portion of this waste stream, however. A good portion of the waste stream is either burned or introduced into landfills.

Through the years, the amount of solid waste generated by individual households, businesses, and governmental units has increased. Disposal of such waste materials has become more difficult. The inconvenience of waste disposal has increased along with the environmental impact of the solid waste on land use, potable water, the atmosphere, and the natural environment.

Recycling efforts have had some success; however, a good portion of recyclable materials is not recycled and remains as solid waste. In order to obtain valuable materials, solid waste materials have been treated or pretreated. None of these pretreatment processes has been widely accepted in view of the relatively high cost and low efficiency. Attempts to introduce apparatus, systems, and processes for treating waste material to form a useful fuel and a recyclable stream is found in Anderson U.S. Pat. Nos. 5,445,329; 5,540,391; 5,655,718; and PCT WO 95/13148, and also in Garrison et al. PCT WO 00/72987. These references disclose apparatus, methods, and processing of municipal solid waste (MSW) into fuel and recyclable streams such as glass, metal, and plastics.

These prior art processes involve an apparatus that can be used to treat solid waste material. The waste material is placed into a vessel, contacted with steam, and processed at increased temperature and pressure. The variety in moisture, temperature, and pressure within the vessel contacting the solid waste under conditions of rotary agitation can cause the solid waste product to break down into a useful burnable solid fuel and can also result in formation of easily separable metal, glass, and plastic streams that can be readily removed from the solid fuel material using conventional separation techniques based on magnets, density, and particle size-type separating systems such as a trommel or flat bed separator.

The vessel in these prior art systems that is used to treat the solid waste requires the application of pressure to successfully treat the solid waste efficiently. The pressure, up to 600 psig (about 4200 kPa), about 60 psig (about 410 kPa) or as little as 10 psig (about 100 kPA), can be maintained within the vessel between charging and discharging the vessel using a closure system. The prior art apparatus and processes, while adequately treating the solid waste for the purpose of obtaining fuel and separable streams, have their productivity reduced by the difficulty in attaching the closure after charging and then removing the closure from the vessel for the purpose of discharging the treated waste. To address this situation, the assignee has described in co-pending PCT Publication WO 2006/041439 and WO 2006/041437 (both incorporated herein by reference) a pressure vessel closure system for use with a pressure vessel that is easily opened and closed during operation at the appropriate operating pressures.

The prior art Anderson U.S. Pat. Nos. 5,445,329; 5,540, 391; 5,655,718; and related PCT WO 95/13148 each describe using multiple vessel systems. These prior art disclosures describe transferring steam between the vessels in order to have an efficient system. However, it has been found that the twin vessel system proposed in these Anderson patents can be improved with respect to efficiency due to issues with steam transfers and also due to timing constraints put on the system. Improvements are desirable.

SUMMARY

Our process and apparatus uses a single pressure vessel, takes a quantity of solid waste and transforms the waste into fuel by adding water and heat to provide no more than 350 BTUs/lb of the weight of the solid waste in no more than 85 minutes. Such a process transforms the solid waste into fuel.

In one embodiment, the system comprises a pressure vessel defining an open interior volume. The vessel includes a moveable door to provide selective access to the open interior volume and to allow for loading of the solid waste into the interior volume. A condenser tank is in fluid communication with the interior volume of the vessel to permit selective addition of water to and evacuation of steam from the interior volume of the vessel. A heater is provided to increase the temperature of the interior volume of the vessel. In certain preferred embodiments, the heater comprises a working fluid (such as oil) that is heated up and circulated through a coil in the interior of the pressure vessel. A vacuum pump is in vacuum communication with the interior volume of the vessel and the condenser tank to selectively reduce pressure within the interior volume of the vessel or the condenser tank. A water pump is in communication with the condenser tank and the interior volume of the vessel to add water to the interior volume of the vessel.

Preferably, a second water pump is in communication with the condenser tank to aid in the evacuation of steam from the interior volume of the vessel to the condenser tank.

The process for converting a waste stream into a valuable fuel and recyclable stream is accomplished in a simple straight forward treatment method using process equipment comprising energy efficient, environmentally sound, cost effective installation that processes solid waste or municipal solid waste and conserves heat energy and produces a clean fuel and recycle stream.

The input stream for the process of the invention is a typical solid stream or a stream comprising a liquid stream with high solids with preferable a substantial cellulosic content. The major component of the stream can be municipal waste, restaurant waste, medical waste, manure, etc. Other streams can be combined with these streams in order to process and safely dispose other waste streams. Such streams can include metal scrap, wood scrap, carcass waste, etc. The bulk density of the input waste stream is about 10 to 30 $lb/ft^3$. Typical bulk density for municipal waste streams is about 13 to 17 $lb/ft^3$. Processing time and temperature is about proportional to bulk density. In other words, a stream with a bulk density of 25 $lb/ft^3$ will take twice the heat input and process time as a stream having a bulk density of about 12.5 $lb/ft^3$.

The process equipment comprises a rotatable treatment vessel arrangement heated by mobile heated working fluid. The rotatable vessel arrangement is operably connected to a pressure vessel and a water tank source that can store and recover heat and provide recycled water, steam and vacuum to the process equipment. One example implementation of an improved process carried on within the processing equipment involves: Solid waste is introduced into one rotatable vessel; the vessel is charged with heated water; and a vacuum is drawn onto the load after the vessel is sealed. A pressure of less than about 0 to about −14.5 psig, or about −5 to −14.5, is drawn in the interior of the vessel, and the vessel is heated by working fluid at a temperature of about 300° F. to 500° F. resulting in a waste temperature of about, 250-300° F., or about 265- 285° F., and as the temperature of the waste increases, the internal pressure increases to about 5-25 psig over a period of about 30 to about 210 minutes, or about 45 to 90 minutes, or about 60 to 75 minutes, causing the waste to form a processed mass. The processed mass has a volume reduction after processing is complete of about 50-66% of initial volume. The processed volume can be separated into at least a fuel fraction and one or more recyclable fraction(s). Typically, as the waste reaches the maximum process temperature, the process is complete and can be removed from the vessel. At completion, the pressure is released into a water mass to recover up to 30% often 25% of the input heat from the process. The balance of the heat is released as steam as the vessel is opened or is contained in the processed mass.

Once treatment is complete, the vacuum is released, heat is recaptured, and the contents are extracted from the vessel. The recyclable portions are easily separated into separate fuel, glass, plastic and metal streams in a trommel or other conventional unit. The glass stream can further be separated into various glass streams by composition or color. The metals can be separated into aluminum, ferrous metal or other streams. The plastic stream can be classified as to polymer type. The fuel stream is typically a cellulosic stream with other components depending on waste source. The heating value of the materials is typically at or near the heating value for cellulose and can be about 2500-8500 BTU/lb, depending on waste source and moisture content. In this way, heat introduced into the vessel is captured in the steam that is drawn from the vessel at the end of the cook. The steam is transferred into the water tank wherein the heat is maintained in the water tank. The heated water is then returned to a vessel for the next cycle. In such a way, the process heat of the treatment is maintained, recycled and reused.

In one aspect, an energy efficient, environmentally sound and cost effective method for processing solid waste comprises: combining solid waste with water in a pressure vessel; establishing a vacuum on the pressure vessel at about 0 to about −14.5 psig and heating the waste to a temperature of about 250 to about 300° F. with a working heating fluid; during heating, causing an increase in pressure in the pressure vessel of about 0 to about +25 psig during the heating period; recycling steam from the pressure vessel; and removing the solid waste in the form of a reduced volume waste. Preferably, the reduced volume waste is separated into at least a fuel stream. Preferably, the amount of water add is at a ratio of about 0.01 to about 0.8 part of water per part by weight of solid waste. Preferably, the reduced volume waste is classified into a fuel stream and another stream including a glass stream, a metal stream and a plastic stream.

A method for converting solid waste into fuel is provided, in another aspect. The method includes rotating a pressure vessel defining an interior volume. While rotating, the method includes loading solid waste into the interior volume of the vessel, the solid waste having a first weight. While rotating, the method includes transforming the solid waste into fuel by adding a quantity of water into the interior volume of the vessel based upon the first weight of the solid waste. Next, pressure is reduced within the volume of the vessel. Next, the interior volume of the vessel is heated based on the first weight of the solid waste for a predetermined amount of time. Next, steam is evacuated from the vessel. Finally, the contents (converted mass) are evacuated from the interior volume of the vessel. At least some portion of the converted mass is fuel.

It is to be understood that both the foregoing general description and the following detailed description are exemplary and explanatory only and are not restrictive of the invention, as claimed. The accompanying drawings, which are incorporated in and constitute a part of this specification, illustrate an example embodiment of the invention and together with the description, serve to explain the principles of the invention.

DETAILED DESCRIPTION

Figure 1:
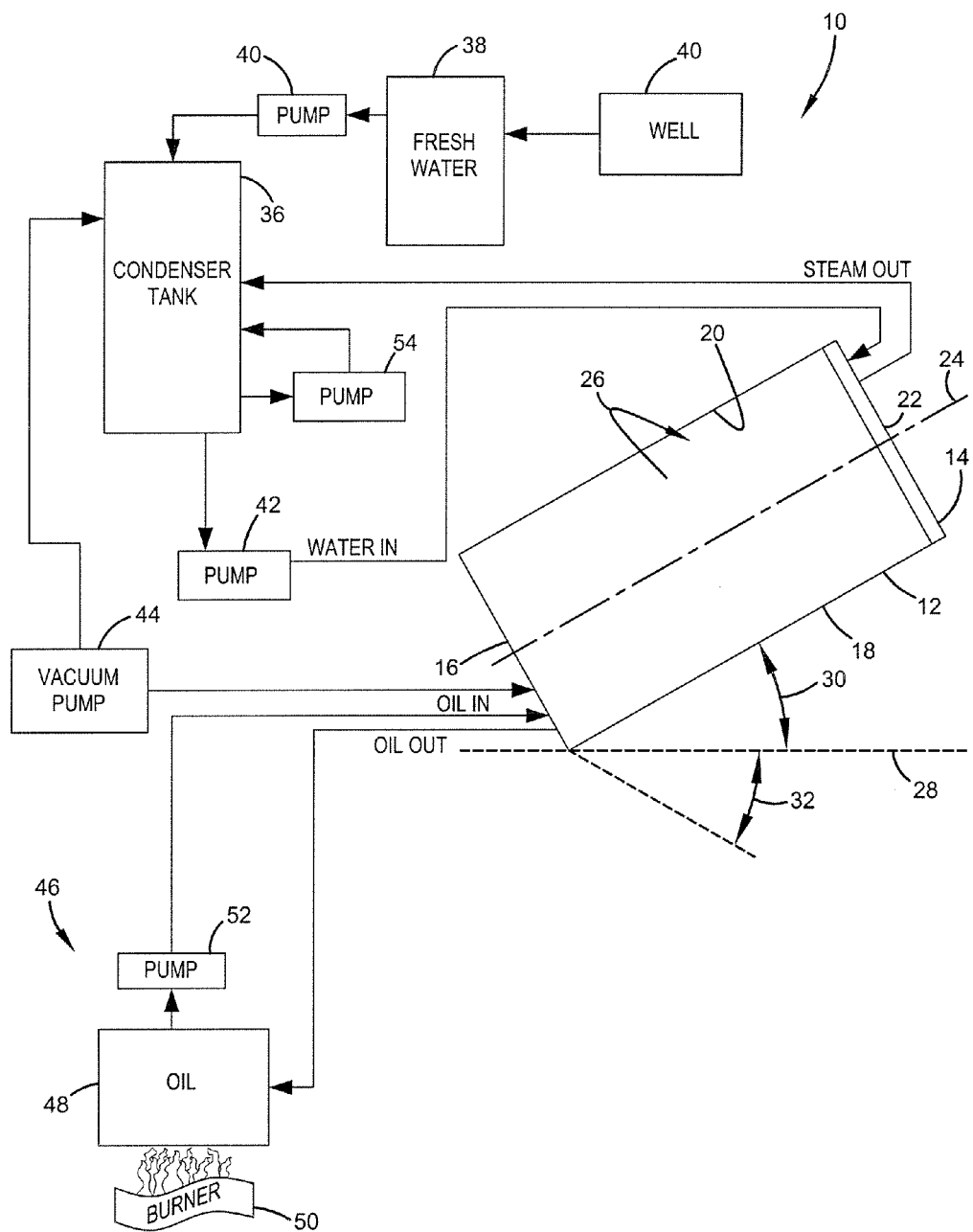
FIG. 1 is a schematic view of a system for processing solid waste into fuel according to principles of this disclosure.

FIG. 1 illustrates a system 10 to process solid waste. One example of solid waste is municipal solid waste (MSW). By "municipal solid waste", it is meant waste materials or garbage arising from residential locations, businesses, industrial sites, military sites, and government sites. Such waste can include inorganic and organic components in the form of cellulosic materials, metals (both ferrous and non-ferrous), plastic, glass, food, and others. Such waste can be derived from packaging materials that can be mixed cellulosic paperboard packaging materials, corrugated paperboard, plastic wrap, plastic bottles, steel cans, aluminum cans, other plastic or metal packaging materials, glass bottles, and container waste. Such waste can be any combination of plastic, metal, and paper. Material typically available in municipal waste that can be used either as feed stock for fuel production or as a valuable recycle product include cellulosic fiber or pulp, paperboard, corrugated paperboard, newsprint, glossy magazine stock, and a variety of other cellulosic board or sheet materials, which can include polymers, fillers, dyes, pigments, inks, coatings, and a variety of other materials. Plastics common in recycle streams include polyolefins such as polyethylene, polypropylene, polyesters such as polyethylene terephthalate, polyvinyl chloride, mixed stream plastics and other thermal plastic materials. Metal streams can include ferrous magnetic metals such as iron, steel, and magnetic alloys, non-ferrous magnetic metals such as aluminum and other such materials in the form of cans, foils, sheet materials, etc. Glass materials can be clear or colored green or brown. Other types of solid waste can also be processed using the apparatus and techniques herein. Those include medical waste, manure, and carcasses.

Once treated by the apparatus and processes disclosed herein, the waste streams can produce a valuable fuel (processed engineered fuel or PEF) and separable metal, plastic, and glass streams that can be sorted, segregated and stored, based on various physical parameters of the waste stream material. For example, the ferrous magnetic metals can be separated by magnetic properties. Other products can be separated by density or other known parameters.

In the process, many contaminating components of such waste streams can be removed by the action of heat and humidity. In other words, the solid waste stream can be cleaned of contaminants, thus improving the quality and value of the recycled products. Food waste is a common contaminant, as are volatile materials, which are quickly removed. Some materials with substantial heating volume, such as inks, coatings, oils, lubricant, and natural greases, and others can remain in the fuel stream. Other less valuable materials are removed by solubilazation using heat, humidity, mechanical process, and energy. Such contaminants can be removed from the waste stream increasing the value of the product. As a result, a clean value-enhanced stream of cellulosic material, glass material, and plastic material can be derived from other process equipment.

The process implemented within the vessel uses the effects of heat, pressure, and humidity within a rotating vessel to receive and process the solid waste material. The vessel is configured to have various positions. The vessel can be in a raised, charging (loading) position during introduction of the solid waste into the vessel. The vessel can then be operated either in the raised or a horizontal position to treat the waste. When the process is ended, the vessel can be lowered to a lowered, discharge angle to remove the treated contents of the vessel and to move the contents to further processing stations.

Within the vessel, at appropriate conditions of temperature, pressure, and humidity, and the rotating mechanical action of the vessel, in combination with the interior structure of the vessel, the waste is transformed, at least partially, into useable fuel (process engineered fuel). Such agitation and changing conditions within the vessel cause the solid waste within the vessel to break fiber-to-fiber bonding, thus resulting in the production of substantially increased fibrous character in the particular cellulosic waste stream. The change in pressure and the change in temperature causes substantial changes in the nature of water within the fibrous material. The change of water from a liquid to a steam improves the quality of the fibrous material resulting in a fiber that can be recycled to provide a pulp, fiber, or high quality fuel.

The vessel includes apparatus for introducing water into the vessel and evacuating steam from the interior of the vessel to introduce moisture or reduce humidity to the waste material within the vessel for treatment purposes. The vessel additionally introduces an enclosed heated stream of fluid (for example, heated oil) positioned appropriately within the interior of the vessel to increase the temperature of the waste. The heat within the vessel is transferred from the mobile fluid to a treatment zone of the vessel. The fluid flow follows a path, typically in a conduit that permits the heating of the interior of the vessel throughout the treatment zone. The heated fluid is separated from the waste within the vessel by the conduit, keeping the mobile fluid free of contamination and in a form that can act to transmit heat into the interior of the structure.

The vessel includes suitable mechanisms to rotate the vessel along a longitudinal axis. To rotate the vessel, one end of the vessel is supported by a motor driven rotation mechanism that can include a belt, chain, gear driven rotation mechanism, or other motor driven apparatus that can impart a rotation to the vessel of about −8 to about 8 revolutions per minute (RPM). At the opposite end of the rotation mechanism, the vessel is mounted in a frame and is supported on a bearing that permits the vessel to rotate within the frame at a desired rotational speed. In light of the vessel rotation, the fluid transfer conduits are preferably configured such that the heating fluid can pass into the rotation vessel through a mechanism to transport the fluid from a stationary conduit to a rotating zone. More details on the vessel are described in commonly assigned PCT Publication WO 2006/041439 and WO 2006/041437, incorporated herein by reference.

In FIG. 1, a pressure vessel is shown schematically at reference numeral 12. The pressure vessel 12 defines a first end 14 and an opposite, second end 16. The vessel 12 has an exterior wall 18 surrounding and defining an open interior volume 20. At first end 14, the vessel 12 includes a movable door 22 to provide selective access to the open interior volume 20 and allow for loading of waste material into the volume 20. The door 22 is selectively closeable to prevent access to the interior volume 20. The door 22 is described in PCT WO 2006/041439 and WO 2006/041437, incorporated herein by reference.

In general, in one embodiment, the vessel 12 is of a size such that the distance between first end 14 and second end 16 is about 27 feet, and the diameter of the vessel 12 is about 8 feet. The size of the open interior volume 20 is about 1200 cubic feet.

The vessel 12 is rotatable about a central longitudinal axis 24. In FIG. 1, arrow 26 indicates the rotatable motion of the vessel 12 about the axis 24. The vessel 12 is rotatable at a speed of about −8 to about 8 RPM, to cause the interior contents of the vessel 12 (usually waste material) to rotate.

The vessel 12 is tiltable or moveable between at least a load position, a cooking position, and a discharge position. In FIG. 1, the vessel 12 is shown in the load position. In this position, garbage or waste material is loaded into the open interior volume 20 through an opening in the vessel created by moving the door 22. The vessel 12 is moved from the horizontal, represented here by reference numeral 28 at an angle 30. The angle 30 is an angle sufficient to allow for waste material to be loaded in the open interior volume 20 to allow it to fill the volume 20. The angle 30 also depends upon the height of the mechanism, such as a conveyor, loading the waste material into the vessel 12. One useable angle for angle 30 is at least 30°, not greater than 90°, for example about 35°-50°, and in one instance, about 40°. As should be appreciated from FIG. 1, when the vessel 12 is in the loading position, the first end 14 including the door 22 is higher than the second end 16, which is also a closed end.

In the cooking position, the first end 14 and second end 16 are close to horizontally even, such that the longitudinal axis 24 of the vessel 12 is about parallel to the horizontal 28. The cooking position is the position in which heat is added to the vessel 12 for a predetermined amount of time to transform the waste material into processed fuel. The cooking process is described further below.

The discharge position includes the vessel 12 lowered at an angle 32. In the discharge position, the first end 14 is horizontally lower than the second end 16. The discharge position allows the contents of the open interior volume 20 to be removed from the interior of the vessel 12 through the opening created by the door 22. The angle 32 can be −5 to −60°, for example −10° to −40°, preferably −12° to −20°.

The system 10 further includes a condenser tank 36. The condenser tank 36 is in fluid communication with the interior volume 20 of the vessel 12 to permit selective addition of water to and evacuation of steam from the interior volume 20 of the vessel 12. The condenser tank 36 is also in fluid communication with a water tank 38 to have available additional water to add to the process. The process is described further below. Communicating between the condenser tank 36 and water tank 38 is a pump 40 to convey water from the water tank 38 to the condenser tank 36, when the condenser tank 36 needs additional water. As will be described further below, during the process, the condenser tank 36 captures steam from the vessel 12 and converts it, or condenses it, from steam to water. Because some of the moisture content will remain in the contents in the vessel 12, additional water will be needed, and is accessed from the water tank 38. The water tank 38 can access at least some water from a well 40, or from other sources.

A water pump 42 is provided between the condenser tank 36 and the vessel 12. The water pump 42 is in communication with the condenser tank 36 and the interior volume 20 of the vessel 12. The water pump 42 is arranged to add water from the condenser tank 36 to the interior volume 20 of the vessel 12, typically, when the door 22 is open.

A second water pump 54 is in communication with the condenser tank 36 and is constructed and arranged to aid in evacuation of steam from the interior volume of the vessel 12 to the condenser tank 36. Preferably, the pump 54 helps to circulate water in the condenser tank 36 as steam is being drawn into the condenser tank 36 from the vessel 12 to help keep the temperature within the condenser tank 36 consistent.

A vacuum pump arrangement 44 is provided in vacuum communication with the interior volume 20 of the vessel 12 and the condenser tank 36. Although a single vacuum pump 44 in communication with both the vessel 12 and the condenser tank 36 is depicted in FIG. 1, it should be understood that two separate vacuum pumps are useable as part of the arrangement, with one in communication with the vessel 12 and with one in communication with the condenser tank 36. The vacuum pump arrangement 44 depicted will selectively reduce pressure within the interior volume 20 of the vessel; and, it will selectively reduce pressure within the condenser tank 36. As will be described further below, during a point in the process, it will be desirable to reduce pressure within the volume 20 of the vessel 12; and, during a point in the process, it will be desirable to reduce pressure within the condenser tank 36 to help evacuate steam from the vessel 12 to the condenser tank 36.

A heater 46 is provided to increase the temperature of the interior volume 20 of the vessel 12. In the embodiment shown in FIG. 1, the heater 46 includes a working fluid, for example, a tank of oil 48, which is heated by, in the embodiment shown, a burner 50. A pump 52 conveys the heated oil 48 from its tank to the vessel 12. The vessel 12 includes internal conduits arranged helically or in a coil to circulate the heated oil 48 through the interior 20 of the vessel 12. In this way, the heated oil does not itself mix up with the contents of the vessel 12. Rather, the heated oil 48 is circulated through the conduits to allow for the heat carried by the oil 48 to transfer from the oil 48 to the contents of the interior volume 20 of the vessel 12. The oil is circulated within the vessel 12 and returned to the tank 48 to allow it to be reused, so that hot oil is always being conveyed and circulated through the vessel 12 during the appropriate heating stage.

Figure 2:
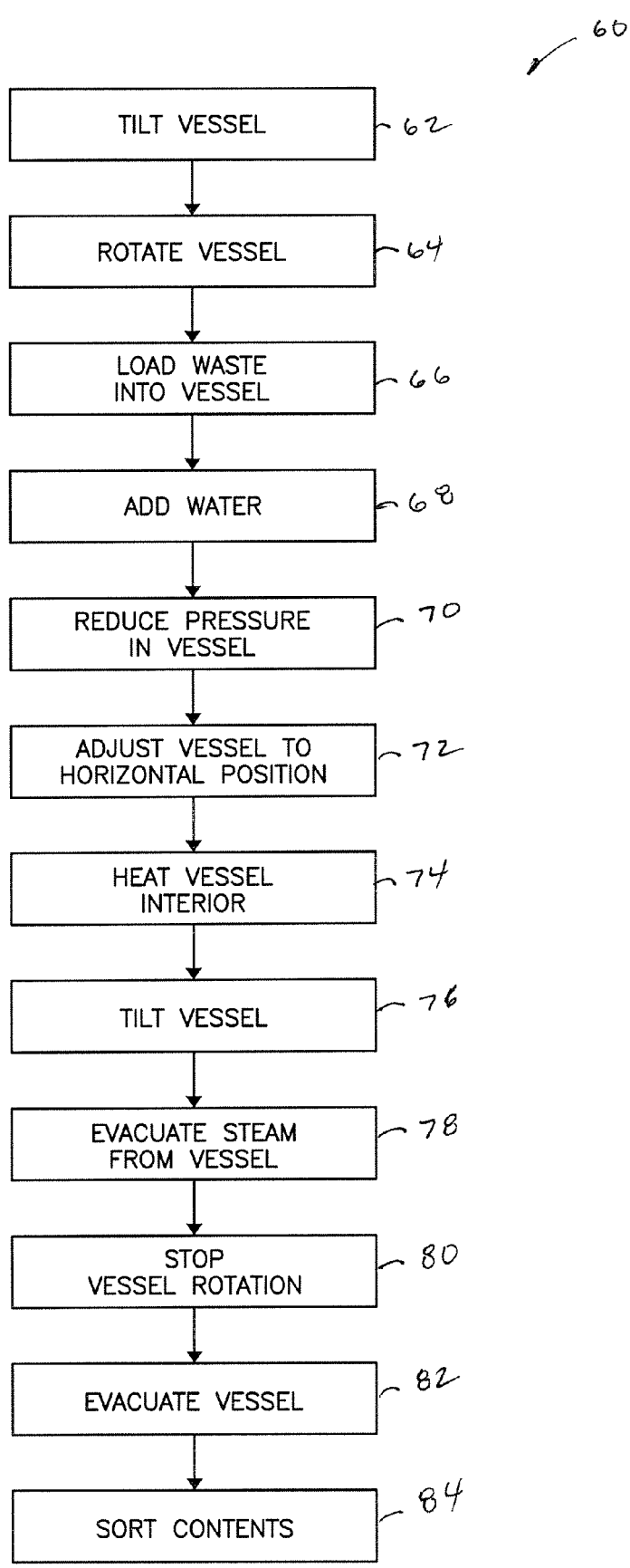
FIG. 2 is a flow chart providing an outline of the process, according to principles of this disclosure.

A method or process for converting solid waste into fuel is shown in FIG. 2 at reference numeral 60. First, the pressure vessel 12 (FIG. 1) is provided. The pressure vessel 12 is tilted or angled at step 62. The step of tilting the vessel 12 at angle 30 relative to the horizontal 28 ensures that the door 22 at the first end 14 is higher than the second end 16. Angle 30, as described above, will depend upon a number of factors including, for example, the height of the conveyor loading the solid waste. In general, the idea is to be able to efficiently load the solid waste into the open volume 20 and allow it to occupy the open volume 20, at the appropriate step. In one embodiment, the angle 30 is between about 35 and 45 degrees. Next, at step 64, the vessel 12 is rotated. Rotation is shown at reference numeral 26 in FIG. 1. The rotation helps to agitate the vessel contents and ensure circulation of moisture, humidity, and heat to the contents within the vessel 12, when solid waste is being loaded therein and then processed. In some embodiments, the vessel 12 will be rotated at –8 to 8 RPM.

At step 66, the solid waste is loaded into the volume 20 of the vessel 12. In some embodiments, this step of loading the solid waste into the vessel is done while the vessel is rotating and while the vessel 12 is angled or tilted in its loaded position. The solid waste loaded into the vessel 12 has been weighed and has a first weight noted. The bulk density of the input waste stream is about 10 to 30 lb/ft$^3$. Typical bulk density for municipal waste streams is about 13 to 17 lb/ft$^3$. Processing time and temperature is about proportional to bulk density. In other words, a stream with a bulk density of 25 lb/ft$^3$ will take twice the heat input and process time as a stream having a bulk density of about 12.5 lb/ft$^3$.

At step 68, a quantity of water is added to the interior volume 20 of the vessel 12. Preferably, the quantity of water is a weight that is about 30-55% of the first weight of the MSW. For example, it has been found that a quantity of water of a weight of about 50% of the first weight of the solid waste is useful. In some processes, the amount of water added is at a ratio of about 0.01 to about 0.8 part of water per part by weight of solid waste. The water is added to the solid waste in the interior volume 20 of the vessel 12 by pumping the water from the condenser tank 36 using pump 42.

Next, the vessel door 22 is closed to block access to the open volume 20. At step 70, pressure is reduced within the interior volume 20. This is done by vacuum pump 44 drawing a vacuum on the interior 20 of the vessel 12. It has been found that a vacuum of less than about 0 to about –14.5 or –15 psig, or about –5 psi to about –10 psi is useful.

At step 72, the vessel 12 is moved from the load position at angle 30 (FIG. 1) to the cooking position. In the embodiment shown in FIG. 1, the cooking position is a horizontal position. In the horizontal position, the first end 14 and the second end 16 are even, such that the longitudinal axis 24 is parallel to the horizontal 28.

At step 74, heat is added to the interior 20 of the vessel 12. This can be accomplished in a number of ways. In the embodiment shown in FIG. 1, an amount of energy is added based on the first weight of the solid waste for a predetermined amount of time. For example, it has been found that no more than 350 BTUs/lb are needed, for example, about 275 BTUs/lb in a time of not greater than 75 minutes is useful. This will cause the solid waste to be at a temperature not greater than 350° F., for example, 220-330° F., or about 265-285° F. (typically, about 270° F.) as the pressure is about 5-25 psig, over a period of about 30 minutes to about 210 minutes, or about 45-90 minutes, or about 60-75 minutes. The heat is added, in this particular embodiment, by circulating a working fluid, for example, oil through a conduit in the vessel 12. The oil is heated to a temperature of about 300° F.-500° F., for example, 380-400° F. for circulation within the vessel 12.

Next, at step 78, steam is unloaded or evacuated from the vessel 12. The steam is returned to the condenser tank 36. The condenser tank 36 will convert the steam back into liquid form for reusing in the process. The vacuum pump 44 draws a vacuum on an air pocket at the upper end of the condenser tank 36, and this vacuum pressure draws steam from the vessel 12 into the condenser tank 36. While this is occurring, the second pump 54 is circulating the water in the tank 36 with the steam being pulled in, and this helps to convert the steam back into liquid form (water), as the second pump 54 helps to distribute an even temperature throughout the tank 36. Typically, a recovery of the input heat is made of up to 30%, often 25%.

In one preferred process, rotation of the vessel 12 has been continuous through the steps of loading 66, adding water 68, reducing pressure 70, adjusting the vessel to the horizontal position 72, heating the vessel interior 74, tilting the vessel 76, and evacuating steam from the vessel 78. In preferred processes, rotation of the vessel 12 stops to permit opening or closing of the door 22.

Next, at step 82, the volume 20 of the vessel 12 is unloaded or evacuated. The unloading or evacuating is done when the vessel 12 is in the discharge position at angle 32 in order to use gravity to help unload the contents. In addition, in preferred processes, the vessel 12 is rotated while the vessel 12 is unloaded to help evacuate the vessel contents.

Next, at step 84, the evacuated contents are sorted. As described above, the contents will include fuel (process engineered fuel (PEF)) and metal (both ferrous and non-ferrous), plastic, and glass. These contents are sorted using known techniques. The fuel may then be burned in a power plant or used in other processes, such as conversion to bio-fuel, for example ethanol.

It should be understood that many of the steps 62-84 can be done in a different order. For example, steps 62 and 64 can be interchanged. Steps 68, 70, 72, and 74 can be done in various different orders. For example, step 72 can be done anytime after the door 22 is closed. For example, steps 78 and 80 can be interchanged.

As used herein, the term "process time" means the time from the beginning of the process 60 (in this case, after the step of loading 66) to the point of the process when step 78 (evacuating the steam from the vessel) has been accomplished. It has been found that the process time for transforming solid waste into a converted mass (which includes, as a part of it, processed engineered fuel) is not greater than 90 minutes, typically not greater than 85 minutes, and preferably not greater than 75 minutes. The converted mass can be sorted into separate value streams, including metals, glass, plastic, and fuel.

Typically, the fuel will have a heat value of at least 2500 BTUs/lb at 55% moisture. The heating value of materials is typically at or near the heating value for cellulose and can be about 2500-8500 BTU/lb, depending on the waste source and moisture content. For typical municipal solid waste, the density of the unprocessed waste is 15 lb/ft$^3$, and this will have a process time of not greater than 85 minutes, typically about 70-80 minutes, for example, about 75 minutes. Typically, the converted mass has an overall volume that is not greater than 50% of the volume of the solid waste before processing. In many instances, the converted mass has an overall volume that is about one-third (about 33%) of the volume of the waste before processing. In other words, the converted mass has a volume reduction after processing is complete of about 50-66% of the initial volume.

It is intended that the specification and examples be considered as exemplary only, with a true scope and spirit and invention being indicated by the following claims.

We claim:

1. A system to process municipal solid waste; the system comprising:
   (a) a pressure vessel defining an open interior volume; the vessel including a movable door to provide selective access to the open interior volume and allow for loading of the solid waste into the interior volume;
   (b) a condenser tank in fluid communication with the interior volume of the vessel to permit selective addition of water to and evacuation of steam from the interior volume of the vessel;
   (c) a heater to increase temperature of the interior volume of the vessel;
   (d) a vacuum pump arrangement in vacuum communication with (i) the interior volume of the vessel to selectively reduce pressure within the interior volume of the vessel; and (ii) the condenser tank to evacuate steam from the interior volume of the vessel to the condenser tank; and
   (e) a water pump in communication with the condenser tank to add water from the condenser tank to the interior volume of the vessel.

2. A system according to claim 1 further including a second water pump in communication with the condenser tank to circulate water within the condenser tank and help in evacuation of steam from the pressure vessel to the condenser tank.

3. A system according to claim 1 wherein the vessel is tiltable between a load position and an unload position.

4. A system according to claim 1 wherein the heater includes a working fluid circulated into the vessel through a conduit.

5. A system according to claim 1 further including a water tank in fluid communication with the condenser tank.

6. A system according to claim 1 wherein the vessel is rotatable.

7. A method for converting municipal solid waste into a converted mass including fuel; the method comprising:
   (a) providing a pressure vessel defining an interior volume;
   (b) loading solid waste into the interior volume of the vessel; the solid waste having a first weight;
   (c) rotating the pressure vessel, and while rotating, transforming the solid waste by:
      (i) adding a quantity of water into the interior volume of the vessel based upon the first weight of the solid waste;
      (ii) reducing pressure within the interior volume of the vessel;
      (iii) heating the interior volume of the vessel based on the first weight of the solid waste for a predetermined amount of time;
      (iv) evacuating steam from the vessel; and
   (d) evacuating the converted mass from the interior volume of the vessel.

8. A method according to claim 7 wherein the step of heating the interior volume includes providing no more than 350 BTU/lb of the first weight of the solid waste for no more than 75 minutes.

9. A method according to claim 7 wherein the step of heating the interior volume includes heating the solid waste to about 220-330° F.

10. A method according to claim 7 wherein the step of adding a quantity of water includes adding water of a weight of 30-55% of the first weight of the solid waste.

11. A method according to claim 7 further including the steps of moving the pressure vessel between a load position, cook position, and unload position.

12. A method according to claim 7 further comprising a step of separating the converted mass into separate streams of: plastics, metals, and process engineered fuel.

13. A method for transforming municipal solid waste into a converted mass containing fuel, the method comprising:
   (a) providing a pressure vessel having first and second opposite ends; the pressure vessel defining an interior volume and having a door at the first end selectively openable and closeable to provide and close access to the interior volume;
   (b) tilting the vessel at a predetermined angle relative to a horizontal surface to provide the door at the first end to be higher than the second end;
   (c) rotating the vessel; while the vessel is rotating,
      (i) loading solid waste into the interior volume of the vessel through an opening of the vessel door; the solid waste having a first weight; and transforming the solid waste into fuel by:

(A) adding a quantity of water into the interior volume of the vessel; the quantity of water being of a weight that is 30-55% of the first weight of the solid waste;
(B) closing the vessel door and reducing pressure within the interior volume of the vessel;
(C) moving the vessel from the predetermined angle to a horizontal orientation;
(D) heating the interior volume of the vessel by inputting an amount of energy based on the first weight of the solid waste for a predetermined amount of time;
(E) tilting the vessel to provide the second end to be higher than the first end; and
(F) evacuating steam from the vessel to a condenser tank;
(d) stopping rotation of the vessel to open the vessel door; and
(e) rotating the vessel while evacuating the converted mass containing fuel from the interior volume of the vessel through the vessel door.

14. A method according to claim 13 wherein the step of evacuating the converted mass containing fuel from the interior volume of the vessel includes evacuating the converted mass and sorting the converted mass.

15. A method according to claim 14 wherein the step of sorting includes sorting the contents between plastics, ferrous metals, non-ferrous metals, and process engineered fuel.

16. A method according to claim 13 wherein:
(a) the step of adding a quantity of water into the interior volume is about 50% of the first weight of the solid waste;
(b) the step of reducing pressure within the interior volume of the vessel includes reducing the pressure about −10 psi; and
(c) the step of heating the interior volume of the vessel includes inputting about 275 BTU/lb of the first weight of the solid waste.

17. A method according to claim 13 wherein the converted mass includes fuel having a heat value of at least 2500 BTUs at 55% moisture.

18. A method according to claim 7 wherein the step of adding a quantity of water into the interior volume of the vessel includes delivering water from a condenser tank and wherein the step of evacuating steam from the vessel further includes delivering the steam to the condenser tank, condensing the steam in the condenser tank and making the condensed steam available for the step of adding a quantity of water into the interior volume of the vessel in a subsequent batch.

19. A method according to claim 18 wherein the step of evacuating steam from the pressure vessel further includes providing a vacuum pump arrangement in fluid communication with the condenser tank and reducing the pressure in the condenser tank.

* * * * *